April 7, 1936.  F. A. STEVENS  2,036,550
OPHTHALMIC MOUNTING AND PARTS THEREOF
Filed April 24, 1934
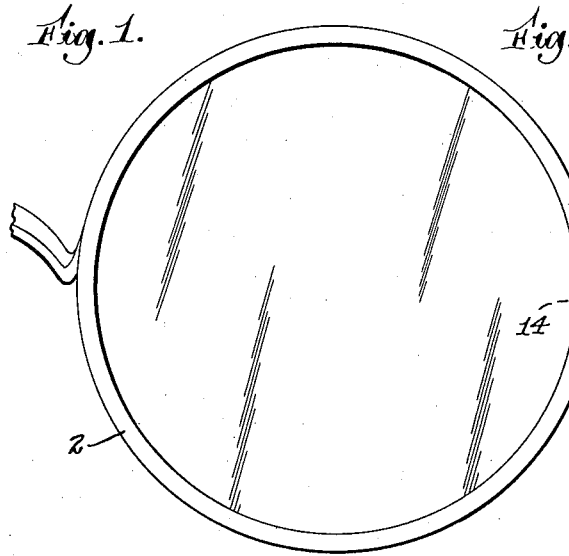
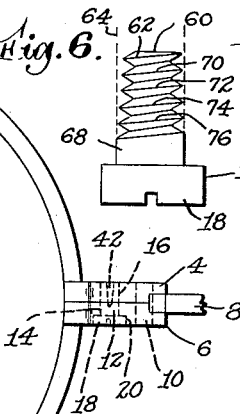
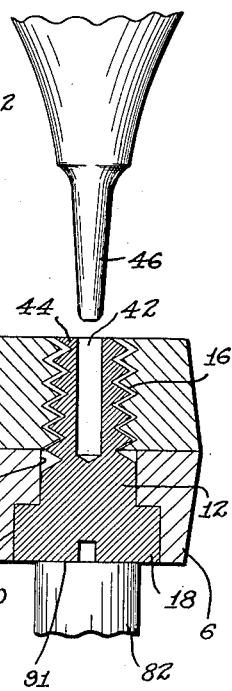
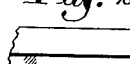
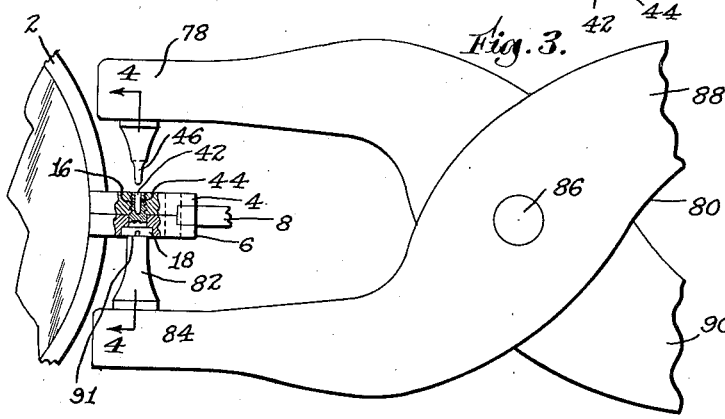
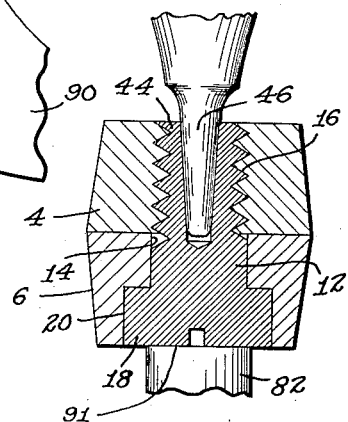
Inventor
Frederick A. Stevens
by David Rines
Attorney Patented Apr. 7, 1936

2,036,550

UNITED STATES PATENT OFFICE 2,036,550

OPHTHALMIC MOUNTING AND PARTS THEREOF

Frederick A. Stevens, Providence, R. I.

Application April 24, 1934, Serial No. 722,092

5 Claims. (Cl. 88—53)

The present invention relates to ophthalmic mountings and parts thereof. Certain features of the invention are, however, of more general utility.

Parts of ophthalmic mountings, and other devices that are similarly held together, have a tendency to separate, because the screws do not hold tight.

A chief object of the invention is to prevent such separations. Another object is to provide a novel means for increasing the frictional contact between external and internal screw threads of the above described character.

A very important object is to assemble and lock in position minute, threaded parts, having very few threads, such as is the case with the screws and dowels used in the manufacture and maintenance of ophthalmic mountings and similar articles. The invention finds particular application in cases where both ends of the threaded parts are exposed to view and for which, therefore, artistic appearance and a high degree of finish are indispensable; also where it is desirable to remove the locked, threaded parts, and to reassemble and relock the parts.

Further objects are to provide flexibility of locking control under the dimensional variations encountered in new and repair work; and to compensate for differences of uniformity and standard shapes and structures of the threaded members, so as to obtain a uniform locking effect irrespective of such differences.

Other and further objects of the invention will be explained hereinafter, and will be more particularly pointed out in the appended claims.

The invention will be described in connection with the accompanying drawing, in which Fig. 1 is a fragmentary elevation of a pair of spectacles embodying the invention; Fig. 2 is a plan of the same; Fig. 3 is an elevation, partly in section, upon a smaller scale, illustrating the novel screw method of the present invention before it has been secured in place; Fig. 4 is an enlarged section, taken upon the line 4—4 of Fig. 3, looking in the direction of the arrows; Fig. 5 is a similar section, illustrating the securing of the screw in position; and Fig. 6 is an enlarged elevation of the screw illustrated in Figs. 1 to 5 before it is longitudinally apertured.

Errors of human vision may be corrected by properly prescribed lenses, mounted in fittings, mostly of metal, and held together by very small screws. One of these fittings is shown as a lens-holding, metal rim 2 of a pair of spectacles, having metal end pieces 4 and 6 between which swings a temple 8 upon a dowel 10. The end pieces 4 and 6 are usually held together by one of the said very small screws, shown as an externally threaded, cylindrical, metal screw 12 disposed loosely in a cylindrical opening 14 of the end piece 6 and threaded into an internally threaded, cylindrical opening 16 in the end piece 4. The head 18 of the screw 12 is seated in a countersink 20 of the end piece 6. These fittings must be adjusted accurately to conform to the facial and visual requirements of each case; and when once fitted, it is highly important that the lenses shall remain in the prescribed positions. As the screws 12 have a tendency to loosen, particularly because of the strains encountered by flexing the temples and wiping the glasses, vibrations due to walking, and the like, it is impossible to obtain this desired result; for to maintain the lenses in the prescribed position, it is necessary that the screws 12 shall continue to hold the assembled parts firmly together, without loosening.

The invention may, of course, be used elsewhere than in ophthalmic mountings, and for other purposes than to hold the end pieces 4 and 6 together, as illustrated and described in a copending application, Serial No. 683,323, filed August 2, 1933, of which the present application is a continuation in part.

These screws 12 have very short, threaded portions; say, about four or five threads long, or about ninety to the inch. The depth of the hereinafter mentioned aperture 42 is in the neighborhood of thirty thousandths of an inch. The diameter of these screws is only about forty five thousandths of an inch, so that the diameter of the aperture 42 may be about twenty thousandths of an inch.

The minute size of the screws 12 used in these ophthalmic mountings is an important factor to be considered. The smallness of the screw diameter, the shortness of the threaded portion, and the speed at which the screws 12 are produced, resulting in variations from cylindrical shape, as hereinafter explained, all play their role in reducing the permanency of the holding power that may be expected of these minute, threaded members. While the defects are of such a nature as to be visible only under magnification, so that it becomes necessary, for illustrative purposes, to exaggerate the drawing, they are nevertheless the prime causes of the said loosening.

The difficulties attendant upon such loosened screws have been appreciated for nearly a century of American spectacle-ware making, and many and various methods and proposals for curing the evils have been made, and actually tried in practice, but the prior proposals have all been discarded, for the desired results have not, up to the present time, been attained. The conditions peculiar to the making and wearing of ophthalmic mountings have not been conducive to the practical production of an efficient, economical, and practical screw lock. Recognizing this fact, indeed, some proposals have involved the elimination of the screws altogether; but as the use of screws seems to be essential, the bothersome and sometimes injurious effects of the invariably loosened binding screws (that are supposed to bind) has continued unremedied.

According to the present invention, prior-art defects are remedied by slightly changing the structure of the screw 12, and properly locking it in place. The screw 12 is provided, at its threaded end, with a preferably cylindrical aperture 42 that extends centrally along, or parallel to, the axis, or longitudinally of the screw 12. A continuous, annular, exteriorly threaded wall 44 is thus formed about the aperture 42.

An aperture 42 that would extend throughout the length of the small-diameter screw 12 would weaken the screw. To drill such a continuous-length aperture in such a screw would be impracticable and, furthermore, would require the use of drills of so weak a nature as to involve large breakage, with consequent increased expense. Preferably, therefore, the length of the aperture 42 is about the same as the length along which the screw threads extend, and the aperture is located in the neighborhood of these screw threads, as shown. The use of the hereinafter-described tapered mandrel 46, furthermore, makes it possible to employ a shorter aperture 42 than would be required with a cylindrical mandrel, though the advantages of the present invention may be attained with either type of mandrel.

The operation is exceedingly simple and most effective. With the parts assembled and the threaded members threaded together, as shown, for example, in Fig. 4, a jaw 82 is positioned against the head 18 of the screw 12, and the swaging mandrel 46 is now driven into the aperture 42. A force is thus exerted against the annular wall 44 of the aperture 42, toward the supporting jaw 82, resulting in expanding the continuous, annular wall 44 preferably in all directions radially outward from the axis of the screw 12, but without breaking the continuity of the annular wall 44. The annular wall 44 thus becomes swaged into tight engagement with the wall of the threaded, cylindrical opening 16 to cause the exterior threads of the screw 12 to lock frictionally against the interior threads of the opening 16. As the continuity of the annular wall is not broken, the external threads of the annular wall remain in tight, frictional engagement with the internal threads of the walls of the opening 16, by reason of the inherent resiliency of the metal of which the screw 12 is made, without splitting the annular wall and without relying upon outside, supplementary holding-member aids to hold the annular wall in place. The mandrel 46 may be withdrawn and the aperture 42 left entirely empty, without the use of a plug in the continuous, expanded aperture 42; yet, owing to the relatively light strains encountered in using ophthalmic mountings, a very effective, non-loosening joint is thus provided, that requires considerable force to produce the integral, circular expansion, and that resists compression and consequent loosening to a remarkable degree.

The screws 12 and the like that are employed in ophthalmic mountings are of such very small dimension, as indicated above, that they present very weak resistive forces to the action of the tools that cut the threads thereon. The resistive force is particularly weak at the extreme, free end 60 of the screw 12, and increases with the distance from the said free end 60 inward toward the screw head 18. The said thread-cutting tools consequently act to reduce the diameter of the screw 12 more at the said free end 60 than along the body thereof, producing a more or less tapering effect in these members near the free end 60. This reduction in diameter near the free end 60 is particularly noticeable at the tops of the threads, as is illustrated in exaggerated form by Fig. 6, where the first convolution 62 of the thread is shown spaced from the dotted lines 64 that represent the original cylindrical body, before the threads were cut therein, this portion being originally of the same diameter as the unthreaded portion 68, adjacent to the head 18. The next convolution 70 is likewise shown spaced from the dotted-line cylinder 64, but not quite so far as the first convolution 60. The third convolution 72 is still closer to the dotted line 64, and the fourth convolution 74 is closer still. The fifth convolution 76, finally, is of about the same diameter as the cylinder 64 and the same would probably be true of subsequent thread convolutions. The first four convolutions 62, 70, 72 and 74, however, render the extreme, free end 60 of the screw 12 progressively tapered or conical.

If the mandrel 46 were cylindrical, therefore, and if the apertures 42 were also cylindrical, the mandrel would expand these first four thread convolutions 62, 70, 72 and 74 against the threaded wall of the opening 16 with less pressure than the fifth convolution 76 and subsequent thread convolutions, if there were any. Not only that, but the degree of pressure with which the threads 62, 70, 72 and 74 bear upon the wall of the opening 16 would be successively less and less in the direction toward the free end 60 of the screw 12. If the screw 12 were of substantial length, this would not be serious, for the remaining thread convolutions could be relied upon to hold the parts effectively together. Such considerations do not apply, however, where the screw-thread convolutions are so few in number that every thread convolution must be relied upon to carry its share of the holding power required to hold the parts together. One reason why ophthalmic-mounting screws loosen so frequently, in fact, is because, the screws being so short, so few of the already few threads, owing to the said unavoidable taper, exert any real binding engagement against the cooperating, internal threads into which they are threaded.

According to a feature of the present invention, therefore, provision is made for compensating for this variation in the diameter of the screw-threaded member 12 by producing a greater degree of expansion near the free end 60 of the screw 12 than at other points, and for gradually decreasing the degree of expansion in a direction from the said free end 60 toward the head 18 of the screw 12. This compensating effect is produced by using a tapering mandrel 46, the small end of the taper being at the free end of the mandrel, as illustrated. When a mandrel of this shape is driven home, as illustrated in Fig. 5, the convolutions 62, 70, 72 and 74 will all be expanded against the walls of the threaded opening 16 so as to bear thereagainst with approximately uniform holding action. If anything, indeed, the holding action of the thread convolutions near the free end 60 of the screw 12 will be greater than that of the threads farther away. This controlled frictional increase between the threads of the screw 12 and the walls of the threaded opening 16 is an important feature of the present invention. Another is the diameter of the longitudinal recess or aperture 42 in relation to the diameter of the screw 12.

The taper near the free end 60 of the screw-threaded member is not constant. It varies with the sharpness of the thread-cutting dies, the speed of the thread-cutting operation and other factors. The use of the tapered mandrel in accordance with a feature of the present invention compensates for all such irregularities, as well as for worn and imperfect threads.

The use of the tapered mandrel is further advantageous because the screws 12 made by different manufacturers are not all of exactly the same diameter. The tapered mandrel 46 may be driven into the aperture 42 to different depths to compensate for such differences in standard dimensions of the screw-threaded members. A cylindrical mandrel would not provide a sufficiently wide range of expansion, unless different-size mandrels were employed, for the variations in screw diameters may be of the order of several thousandths of an inch. From the point of view of the broad aspect of the invention, however, the results produced by the use of a cylindrical mandrel are within the scope of the invention, as defined by the appended claims, and as illustrated and described in the said copending application, Serial No. 683,323.

The compensating mandrel 46, intended for the entrance and expansion of the aperture 42, may be mounted on one jaw 78 of a hand tool 80; and the cooperating supporting anvil 82 for the head 18 of the screw on the other jaw 84, the mandrel 46 and the anvil 82 being in alinement when the tool is effective, as illustrated in Fig. 5. The head 18 of the screw 12 is engaged by the anvil 82, as before described, and the mandrel 46 is driven home into the aperture 42 by progressively pivoting the jaws 78 and 84 toward each other, about a pivot 86. The degree of compressive drive of the mandrel 46 may be controlled by pivoting the jaws 78 and 84 towards each other to a greater or less degree, as desired. A reverse movement of the handles 88 and 90 of the tool will effect withdrawal of the mandrel 46.

By varying the degree of pressure applied by the hand to the handles 88 and 90 of the hand tool 80, when a tapering mandrel is employed, or by varying the diameter of a cylindrical mandrel, it is possible to obtain practically any desired degree of uniform, frictional engagement, depending upon the use to which the joint is to be put. The more nearly cylindrical the screw-threaded member 12 is, the less will be the range of expansion of the wall 44 that may be required. The degree of taper of the mandrel may vary in accordance with desired conditions, bearing in mind that the invention is particularly adapted to small-dimensioned members constituted of light metals, such as are employed in the manufacture of ophthalmic mountings. A taper of two or three degrees may, under some circumstances, be sufficient, but at least ten degrees may ordinarily be required to take care of reasonable variations occuring in practice. Owing to the dimensions and the metal of the screw-threaded members, there is no danger that a taper of this magnitude would fracture the light metal, such as precious metal and its alloys, and nickel alloys.

The contacting end of the supporting anvil 82 is shown slightly smaller in diameter than the diameter of the screw head 18 against which it functions. This ensures that the head 18 shall, at all times, contact with the anvil 82 when the mandrel 46 is engaged in its expansion of the walls of the aperture 42. The double contact thus produced at opposite ends of the screw 12 ensures a completely controlled, radial expansion. To obtain such a controlled, even, radial expansion, it is desirable that the pressure should be applied to both ends of the screw 12 at one and the same time, else there might be an endwise crowding of the screw against the threads of the opening 16, instead of the desired expansion.

If, for example, the countersink 20 were deeper than the thickness of the screw head 18, and if the diameter of the anvil 82 were greater than that of the screw head 18, there would then be a vacancy between them, or a gap, at the point marked 91 in Fig. 4. The downward drive of the mandrel 46, against the walls of the aperture 42, might then, owing to the small dimensions above described, result in the screw 12 being forced downward to fill this vacancy or gap. Instead of the desired, controlled expansion, there might be an uncontrolled upsetting action of the threads.

The present invention provides an effective lock against accidental loosening of the screw-threaded members, both ends of which are exposed to view, and without disfiguring the final product, for an article, like an ophthalmic mounting, that is worn on the face, must have an attractive appearance.

It will be understood that the dimensions above given are for illustrative purposes, and that, in any particular case, they may be varied to suit such particular case. The depth and diameter of the aperture 42, for example, should be such as will produce the desired radial expansion for the particular purpose in hand. The threaded, metal, annular wall 44 must possess strength and flexibility to withstand the expanding operations without fracture. The flexibility must be of such a nature as to allow, in case of need, as to replace a broken lens, withdrawal of the screw 12 intact, a reinsertion of the same screw 12 or another screw 12, and a relocking, if desired; for the locking of the screw does not injure either the screw 12 itself, or the parts in which it is locked. The manner of application and control of this internal-expansion principle, as applied to varying shapes, sizes and conditions, has resulted in a locking achievement not heretofore produced.

Modifications will occur to persons skilled in the art, and all such are intended to be included within the scope of the appended claims.

What is claimed is:

1. An ophthalmic mounting comprising a part of relatively light material having a threaded, substantially cylindrical opening, and a relatively small-dimensioned, light, exteriorly threaded, substantially cylindrical, metal member the free end of which is slightly tapered, with a substantial portion of the threads disposed at the said free end, the member being threaded in the threaded opening with said end substantially flush with a face of said part, the member having a longitudinally extending aperture substantially parallel to the axis of the cylinder extending from said free end inward toward the other end of the member in the neighborhood of the exterior threads so as to form a continuous, annular, exteriorly threaded wall, the continuous, annular wall being swaged by expansion radially outward from the axis of the cylinder, without breaking the continuity of the annular wall, into tight engagement with the wall of the cylindrical opening along a region extending from the end of the cylindrical opening near the said face a substantial distance into the cylindrical opening, but with a greater degree of expansion at the said free, tapered end than at the cylindrical body parts of the said exteriorly threaded member, the material and the dimensions of the member being such as to cause the exterior threads upon the annular wall to lock frictionally against the threads of the cylindrical opening along the said region by the inherent resiliency of the swaged metal without the aid of a locking plug permanently positioned in the aperture.

2. An ophthalmic mounting comprising a part of relatively light material having a threaded, substantially cylindrical opening, and a relatively small-dimensioned, light, substantially cylindrical, metal member exteriorly threaded at one end and threaded in the threaded opening with said end substantially flush with a face of the said part, the member having a longitudinally extending aperture substantially parallel to the axis of the cylinder extending from said end inward toward the other end of the member in the neighborhood of the exterior threads so as to form a continuous, annular, exteriorly threaded wall, the continuous, annular wall being swaged by expansion radially outward from the axis of the cylinder, without breaking the continuity of the annular wall, into tight engagement with the wall of the cylindrical opening along a region extending from the end of the cylindrical opening near the said face a substantial distance into the cylindrical opening, the material and the dimensions of the member being such as to cause the exterior threads upon the annular wall to lock frictionally against the threads of the cylindrical opening along the said region by the inherent resiliency of the swaged metal without the aid of a locking plug permanently positioned in the aperture.

3. An ophthalmic mounting comprising two end pieces of relatively light material, one of the end pieces having an opening communicating with a countersink, the other end piece having a threaded, substantially cylindrical opening alined with the first-named opening, and a relatively small-dimensioned, light, substantially cylindrical, headed, metal screw disposed in the first-named opening, with the head of the screw in the countersink and the threads of the screw threaded in the threaded opening and with the threaded end of the screw substantially flush with a face of the said other end piece, the screw having a longitudinally extending aperture substantially parallel to the axis of the screw extending from the threaded end of the screw inward toward the head of the screw, but not entirely throughout the length of the screw, so as to form a continuous, annular, exteriorly threaded wall, the continuous, annular wall being swaged by expansion, without breaking the continuity of the annular wall, into tight engagement with the wall of the cylindrical opening along a region extending from the end of the cylindrical opening near the said face a substantial distance into the cylindrical opening, the material and the dimensions of the screw being such as to cause the threads of the screw to lock frictionally against the threads of the cylindrical opening along the said region by the inherent resiliency of the swaged metal without the aid of a locking plug permanently positioned in the aperture.

4. An ophthalmic mounting comprising a part of relatively light material having a threaded, substantially cylindrical opening, and a relatively small-dimensioned, light, substantially cylindrical, metal member exteriorly threaded at one end and threaded in the threaded opening with said end substantially flush with a face of the said part, the member having a longitudinally extending aperture substantially parallel to the axis of the cylinder extending from said end inward toward the other end of the member in the neighborhood of the exterior threads for a distance substantially equal to the length along which the exterior threads extend, so as to form a continuous, annular, exteriorly threaded wall throughout substantially the said length, the continuous, annular wall being swaged by expansion radially outward from the axis of the cylinder, without breaking the continuity of the annular wall, into tight engagement with the wall of the cylindrical opening throughout substantially the said length, the material and the dimensions of the member being such as to cause the exterior threads upon the annular wall to lock frictionally against the threads of the cylindrical opening along the said region by the inherent resiliency of the swaged metal without the aid of a locking plug permanently positoned in the aperture.

5. For use in ophthalmic mountings and the like having a part of relatively light material provided with a threaded, substantially cylindrical opening, a relatively small-dimensioned, light, substantially cylindrical, metal member exteriorly threaded at one end so as to be adapted to be threaded in the opening and having a longitudinally extending aperture substantially parallel to the axis of the cylinder extending from said end inward toward the other end of the member in the neighborhood of the exterior threads, but not entirely throughout the length of the member, so as to form a continuous, annular, exteriorly threaded wall that may be swaged by expansion radially outward from the axis of the cylinder, without breaking the continuity of the annular wall, into tight engagement with the wall of the cylindrical opening along a region extending from the extreme portion of said first-named end a substantial distance inward toward said other end, the material and the dimensions of the member being such as to cause the exterior threads upon the annular wall to lock frictionally against the threads of the cylindrical opening along the said region by the inherent resiliency of the swaged metal without the aid of a locking plug permanently positioned in the aperture.

FREDERICK A. STEVENS.